United States Patent
Strom et al.

(10) Patent No.: US 8,972,243 B1
(45) Date of Patent: Mar. 3, 2015

(54) PARSE INFORMATION ENCODING IN A FINITE STATE TRANSDUCER

(71) Applicants: Nikko Strom, Kirkland, WA (US); Karthik Ramakrishnan, Bellevue, WA (US)

(72) Inventors: Nikko Strom, Kirkland, WA (US); Karthik Ramakrishnan, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 179 days.

(21) Appl. No.: 13/681,503

(22) Filed: Nov. 20, 2012

(51) Int. Cl.
*G06F 17/27* (2006.01)
*G10L 21/00* (2013.01)
*G10L 15/18* (2013.01)

(52) U.S. Cl.
CPC ........................................ *G10L 15/18* (2013.01)
USPC ..................................... 704/9; 704/1; 704/231

(58) Field of Classification Search
CPC ... G10L 15/193; G10L 15/24; G06F 17/2775; G06F 17/2785
USPC .............. 704/1, 9, 10, 275, 275.231
See application file for complete search history.

(56) References Cited

U.S. PATENT DOCUMENTS

| | | | |
|---|---|---|---|
| 6,816,830 B1 * | 11/2004 | Kempe | 704/9 |
| 7,451,089 B1 * | 11/2008 | Gupta et al. | 704/270.1 |
| 7,617,089 B2 * | 11/2009 | Huttenhower | 704/9 |
| 7,778,944 B2 * | 8/2010 | Bangalore | 706/12 |
| 7,783,492 B2 * | 8/2010 | Bangalore et al. | 704/275 |
| 7,869,998 B1 * | 1/2011 | Di Fabbrizio et al. | 704/251 |
| 8,060,357 B2 * | 11/2011 | Segond et al. | 704/1 |
| 8,214,212 B2 * | 7/2012 | Bangalore et al. | 704/249 |
| 8,386,264 B2 * | 2/2013 | Hori et al. | 704/275 |
| 8,438,031 B2 * | 5/2013 | Ross et al. | 704/257 |
| 8,645,122 B1 * | 2/2014 | Di Fabbrizio et al. | 704/9 |
| 2003/0065505 A1 * | 4/2003 | Johnston et al. | 704/9 |
| 2009/0063375 A1 * | 3/2009 | Bangalore | 706/12 |
| 2013/0289994 A1 * | 10/2013 | Newman et al. | 704/254 |

OTHER PUBLICATIONS

Hunt et al. Speech Recognition Grammar Specification Version 1.0. W3C Recommendation, Mar. 16, 2004.

* cited by examiner

*Primary Examiner* — Douglas Godbold
(74) *Attorney, Agent, or Firm* — Seyfarth Shaw LLP; Ilan N. Barzilay

(57) ABSTRACT

In automatic speech recognition, certain parsing information, such as rules and tags, may be embedded into a finite state transducer (FST) to produce FST output that includes speech recognition results along with codes indicating parsing results of the recognized speech. The codes in the FST output may be formatted using a markup language, such as XML or JSON, for processing by a later application. The FST may be constructed according to a grammar defining the parsing information. The codes for inclusion in the FST output may be embedded into arcs of the FST and then included in the FST output when the speech recognition engine traverses the arcs of the FST.

21 Claims, 13 Drawing Sheets

US 8,972,243 B1

PARSE INFORMATION ENCODING IN A FINITE STATE TRANSDUCER

BACKGROUND

Human-computer interactions have progressed to the point where humans can control computing devices, and provide input to those devices, by speaking. Computing devices employ techniques to identify the words spoken by a human user based on the various qualities of a received audio input. Such techniques are called speech recognition or automatic speech recognition (ASR). Speech recognition combined with language processing techniques may allow a user to control a computing device to perform tasks based on the user's spoken commands. Speech recognition may also convert a user's speech into text data which may then be provided to various textual based programs and applications.

Speech recognition may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

In ASR processing, it may sometimes be desirable to create special designations, such as rules, tags, and the like, to operate on processed speech for purposes of improving the functionality of applications that will ultimately use the processed speech (such as, for example, telephone banking applications). It may also be desirable during ASR processing to rely on processing techniques such as a finite state transducer (FST). Due to the "flat" nature of an FST, however, hierarchical designations such as rules, sub-rules, etc. may be lost during ASR processing with a traditional FST.

To counter this problem, a special configuration of FST is offered. An enhanced FST may be constructed that includes rule encoding along the arcs of an FST so that when the FST is traversed during ASR processing, the rule codes are included in the output string of processed speech. The result is an output string which includes not only the processed speech, but also the codes indicating when rules are applied during the processing of the speech.

Figure 1:
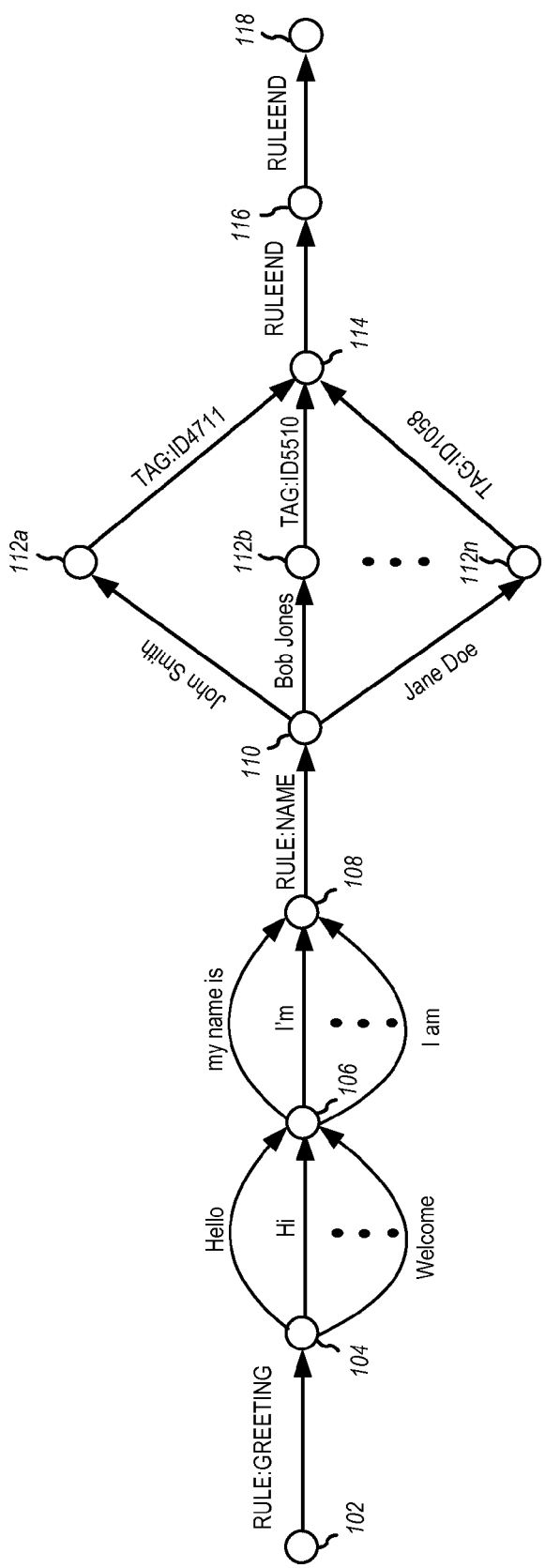
FIG. 1 illustrates portions of an enhanced finite state transducer according to one aspect of the present disclosure.

An example of a portion of such an enhanced FST is shown in FIG. 1. For purposes of illustration, the FST is shown to indicate portions of a greeting in arcs between nodes in addition to individual words. Further, for illustration purposes, FIG. 1 illustrates the FST outputs and not the FST inputs, which would be the spoken text hypothesis from the ASR processing. As shown, codes such as "RULE:GREETING" may be inserted into the FST to be output whenever the ASR processor traverses the specific arc containing the code. The codes inserted into the FST may also be configured for specific post-ASR processing. In this manner, as explained in detail below, ASR functionality and post-ASR functionality may be improved.

Figure 2:
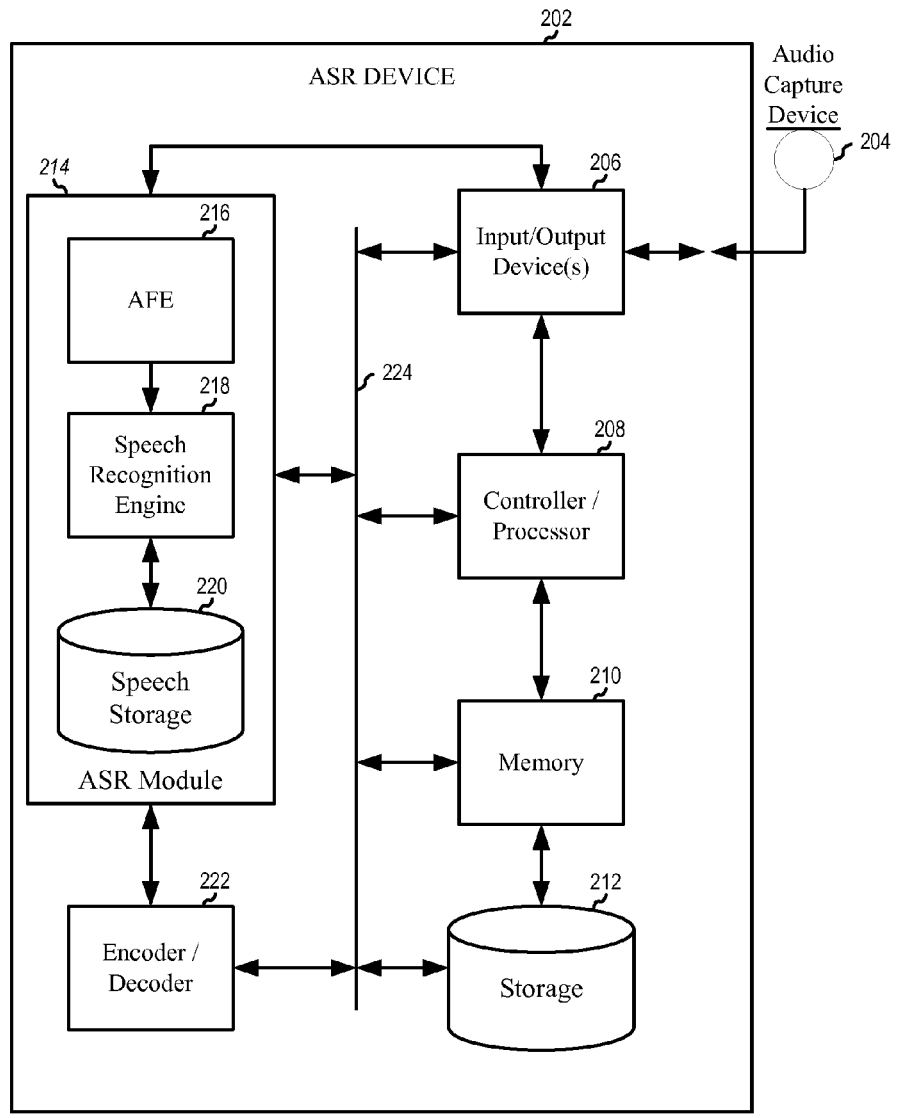
FIG. 2 is a block diagram conceptually illustrating a device for speech recognition according to one aspect of the present disclosure.

FIG. 2 shows an automatic speech recognition (ASR) device 202 for performing speech recognition. Aspects of the present disclosure include computer-readable and computer-executable instructions that may reside on the ASR device 202. FIG. 2 illustrates a number of components that may be included in the ASR device 202, however other non-illustrated components may also be included. Also, some of the illustrated components may not be present in every device capable of employing aspects of the present disclosure. Further, some components that are illustrated in the ASR device 202 as a single component may also appear multiple times in a single device. For example, the ASR device 202 may include multiple input/output devices 206 or multiple controllers/processors 208.

Multiple ASR devices may be employed in a single speech recognition system. In such a multi-device system, the ASR devices may include different components for performing different aspects of the speech recognition process. The multiple devices may include overlapping components. The ASR device as illustrated in FIG. 2 is exemplary, and may be a stand-alone device or may be included, in whole or in part, as a component of a larger device or system.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The ASR device 202 may also be a component of other devices or systems that may provide speech recognition functionality such as automated teller machines (ATMs), kiosks, home appliances (such as refrigerators, ovens, etc.), vehicles (such as cars, busses, motorcycles, etc.), and/or exercise equipment, for example.

As illustrated in FIG. 2, the ASR device 202 may include an audio capture device 204 for capturing spoken utterances for processing. The audio capture device 204 may include a microphone or other suitable component for capturing sound. The audio capture device 204 may be integrated into the ASR device 202 or may be separate from the ASR device 202. The ASR device 202 may also include an address/data bus 224 for conveying data among components of the ASR device 202. Each component within the ASR device 202 may also be directly connected to other components in addition to (or instead of) being connected to other components across the bus 224. Although certain components are illustrated in FIG. 2 as directly connected, these connections are illustrative only and other components may be directly connected to each other (such as the ASR module 214 to the controller/processor 208).

The ASR device 202 may include a controller/processor 208 that may be a central processing unit (CPU) for processing data and computer-readable instructions and a memory 210 for storing data and instructions. The memory 210 may include volatile random access memory (RAM), non-volatile read only memory (ROM) and/or other types of memory. The ASR device 202 may also include a data storage component 212, for storing data and instructions. The data storage component 212 may include one or more storage types such as magnetic storage, optical storage, solid-state storage, etc. The ASR device 202 may also be connected to removable or external memory and/or storage (such as a removable memory card, memory key drive, networked storage, etc.) through the input/output device 206. Computer instructions for processing by the controller/processor 208 for operating the ASR device 202 and its various components may be executed by the controller/processor 208 and stored in the memory 210, storage 212, external device, or in memory/storage included in the ASR module 214 discussed below. Alternatively, some or all of the executable instructions may be embedded in hardware or firmware in addition to or instead of software. The teachings of this disclosure may be implemented in various combinations of software, firmware and/or hardware, for example.

The ASR device 202 includes input/output device(s) 206. A variety of input/output device(s) may be included in the device. Example input devices include an audio capture device 204, such as a microphone (pictured as a separate component), a touch input device, keyboard, mouse, stylus or other input device. Example output devices include a visual display, tactile display, audio speakers, headphones, printer or other output device. The input/output device 206 may also include an interface for an external peripheral device connection such as universal serial bus (USB), FireWire, Thunderbolt or other connection protocol. The input/output device 206 may also include a network connection such as an Ethernet port, modem, etc. The input/output device 206 may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, etc. Through the input/output device 206 the ASR device 202 may connect to a network, such as the Internet or private network, which may include a distributed computing environment.

The device may also include an ASR module 214 for processing spoken audio data into text. The ASR module 214 transcribes audio data into text data representing the words of the speech contained in the audio data. The text data may then be used by other components for various purposes, such as executing system commands, inputting data, etc. Audio data including spoken utterances may be processed in real time or may be saved and processed at a later time. A spoken utterance in the audio data is input to the ASR module 214 which then interprets the utterance based on the similarity between the utterance and models known to the ASR module 214. For example, the ASR module 214 may compare the input audio data with models for sounds (e.g., speech units or phonemes) and sequences of sounds to identify words that match the sequence of sounds spoken in the utterance of the audio data.

The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Based on the considered factors and the assigned recognition score, the ASR module 214 may output the most likely words recognized in the audio data. The ASR module 214 may also output multiple alternative recognized words in the form of a lattice or an N-best list (described in more detail below).

While a recognition score may represent a probability that a portion of audio data corresponds to a particular phoneme or word, the recognition score may also incorporate other information which indicates the ASR processing quality of the scored audio data relative to the ASR processing of other audio data. A recognition score may be represented as a number on a scale from 1 to 100, as a probability from 0 to 1, a log probability or other indicator. A recognition score may indicate a relative confidence that a section of audio data corresponds to a particular phoneme, word, etc.

The ASR module 214 may be connected to the bus 224, input/output device(s) 206, audio capture device 204, encoder/decoder 222, controller/processor 208 and/or other component of the ASR device 202. Audio data sent to the ASR module 214 may come from the audio capture device 204 or may be received by the input/output device 206, such as audio data captured by a remote entity and sent to the ASR device 202 over a network. Audio data may be in the form of a digitized representation of an audio waveform of spoken utterances. The sampling rate, filtering and other aspects of the analog-to-digital conversion process may impact the overall quality of the audio data. Various settings of the audio capture device 204 and input/output device 206 may be configured to adjust the audio data based on traditional tradeoffs of quality versus data size or other considerations.

The ASR module 214 includes an acoustic front end (AFE) 216, a speech recognition engine 218 and speech storage 220. The AFE 216 transforms audio data into data for processing by the speech recognition engine 218. The speech recognition engine 218 compares the speech recognition data with the acoustic, language and other data models and information stored in the speech storage 220 for recognizing the speech contained in the original audio data. The AFE 216 and speech recognition engine 218 may include their own controller(s)/processor(s) and memory or they may use the controller/processor 208 and memory 210 of the ASR device 202, for example. Similarly, the instructions for operating the AFE 216 and speech recognition engine 218 may be located within the ASR module 214, within the memory 210 and/or storage 212 of the ASR device 202, or within an external device.

Figure 3:
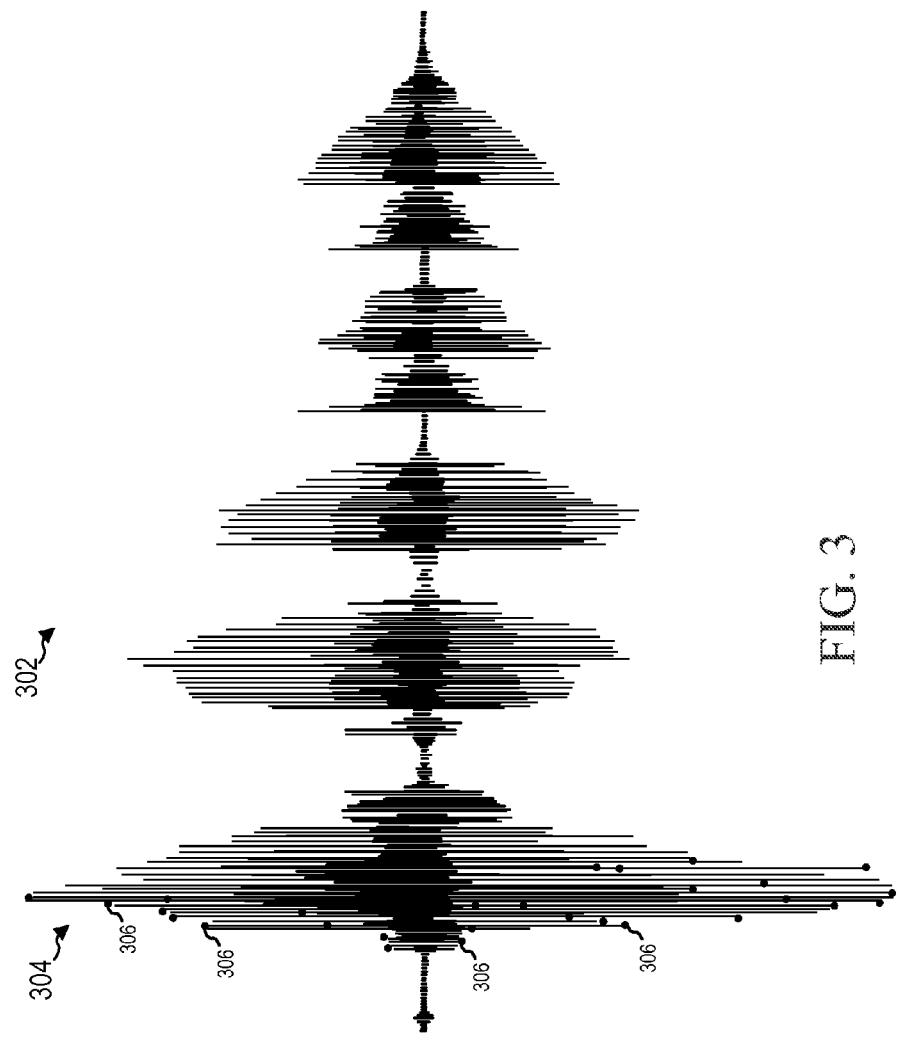
FIG. 3 illustrates an audio waveform processed according to one aspect of the present disclosure.

Received audio data may be sent to the AFE 216 for processing. The AFE 216 may reduce noise in the audio data, identify parts of the audio data containing speech for processing and segment and process the identified speech components. The AFE 216 may divide the digitized audio data into frames, with each frame representing a time interval, for example 10 milliseconds (ms). During that frame the AFE 216 determines a set of values, called a feature vector, representing the features/qualities of the utterance portion within the frame. Feature vectors may contain a varying number of values, for example forty. The feature vector may represent different qualities of the audio data within the frame. FIG. 3 shows a digitized audio data waveform 302, with multiple points 306 of the first word 304 as the first word 304 is being processed. The audio qualities of those points may be stored into feature vectors. Feature vectors may be streamed or combined into a matrix that represents a time period of the spoken utterance. These feature vector matrices may then be passed to the speech recognition engine 218 for processing. A number of approaches may be used by the AFE 216 to process the audio data. Such approaches may include using mel-frequency cepstral coefficients (MFCCs), perceptual linear predictive (PLP) techniques, neural network feature vector techniques, linear discriminant analysis, semi-tied covariance matrices, or other approaches known to those of skill in the art.

Processed feature vectors may be output from the ASR module 214 and sent to the input/output device 206 for transmission to another device for further processing. The feature vectors may be encoded and/or compressed by the encoder/decoder 222 prior to transmission. The encoder/decoder 222 may be customized for encoding and decoding ASR data, such as digitized audio data, feature vectors, etc. The encoder/decoder 222 may also encode non-ASR data of the ASR device 202, for example using a general encoding scheme such as .zip, etc. The functionality of the encoder/decoder 222 may be located in a separate component, as illustrated in FIG. 2, or may be executed by the controller/processor 208, ASR module 214, or other component, for example.

The speech recognition engine 218 may process the output from the AFE 216 with reference to information stored in the speech storage 220. Alternatively, post front-end processed data (such as feature vectors) may be received by the ASR module 214 from another source besides the internal AFE 216. For example, another entity may process audio data into feature vectors and transmit that information to the ASR device 202 through the input/output device(s) 206. Feature vectors may arrive at the ASR device 202 encoded, in which case they may be decoded (for example by the encoder/decoder 222) prior to processing by the speech recognition engine 218.

The speech storage 220 includes a variety of information for speech recognition such as data matching pronunciations of phonemes to particular words. This data may be referred to as an acoustic model. The speech storage may also include a dictionary of words or a lexicon. The speech storage may also include data describing words that are likely to be used together in particular contexts. This data may be referred to as a language or grammar model. The speech storage 220 may also include a training corpus that may include recorded speech and/or corresponding transcription, that may be used to train the models used by the ASR module 214 in speech recognition. The training corpus may be used to train the speech recognition models, including the acoustic models and language models, in advance. The models may then be used during ASR processing.

The training corpus may include a number of sample utterances with associated feature vectors and associated correct text that may be used to create, for example, acoustic models and language models. The sample utterances may be used to create mathematical models corresponding to expected audio for particular speech units. Those speech units may include a phoneme, syllable, part of a syllable, word, etc. The speech unit may also include a phoneme in context such as a triphone, quinphone, etc. Phonemes in context used regularly in speech may be associated with their own models. Phonemes in context that are less common may be clustered together to have a group model. By clustering phoneme groups in this manner, fewer models may be included in the training corpus, thus easing ASR processing. The training corpus may include multiple versions of the same utterance from different speakers to provide different utterance comparisons for the ASR module 214. The training corpus may also include correctly recognized utterances as well as incorrectly recognized utterances. These incorrectly recognized utterances may include grammar errors, false recognition errors, noise, or other errors that provide the ASR module 214 with examples of error types and corresponding corrections, for example.

Other information may also be stored in the speech storage 220 for use in speech recognition. The contents of the speech storage 220 may be prepared for general ASR use or may be customized to include sounds and words that are likely to be used in a particular application. For example, for ASR processing at an ATM (automated teller machine), the speech storage 220 may include customized data specific to banking transactions. In certain instances the speech storage 220 may be customized for an individual user based on his/her individualized speech input. To improve performance, the ASR module 214 may revise/update the contents of the speech storage 220 based on feedback of the results of ASR processing, thus enabling the ASR module 214 to improve speech recognition beyond the capabilities provided in the training corpus.

The speech recognition engine 218 attempts to match received feature vectors to language phonemes and words as known in the speech storage 220. The speech recognition engine 218 computes recognition scores for the feature vectors based on acoustic information and language information. The acoustic information is used to calculate an acoustic score representing a likelihood that the intended sound represented by a group of feature vectors match a language phoneme. The language information is used to adjust the acoustic score by considering what sounds and/or words are used in context with each other, thereby improving the likelihood that the ASR module outputs speech results that make sense grammatically.

The speech recognition engine 218 may use a number of techniques to match feature vectors to phonemes. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle and end of a spoken language sound). An initial determination of a probability of a potential phoneme may be associated with one state. As new feature vectors are processed by the speech recognition engine 218, the state may change or stay the same, based on the processing of the new feature vectors. A Viterbi algorithm may be used to find the most likely sequence of states based on the processed feature vectors.

Figure 4:
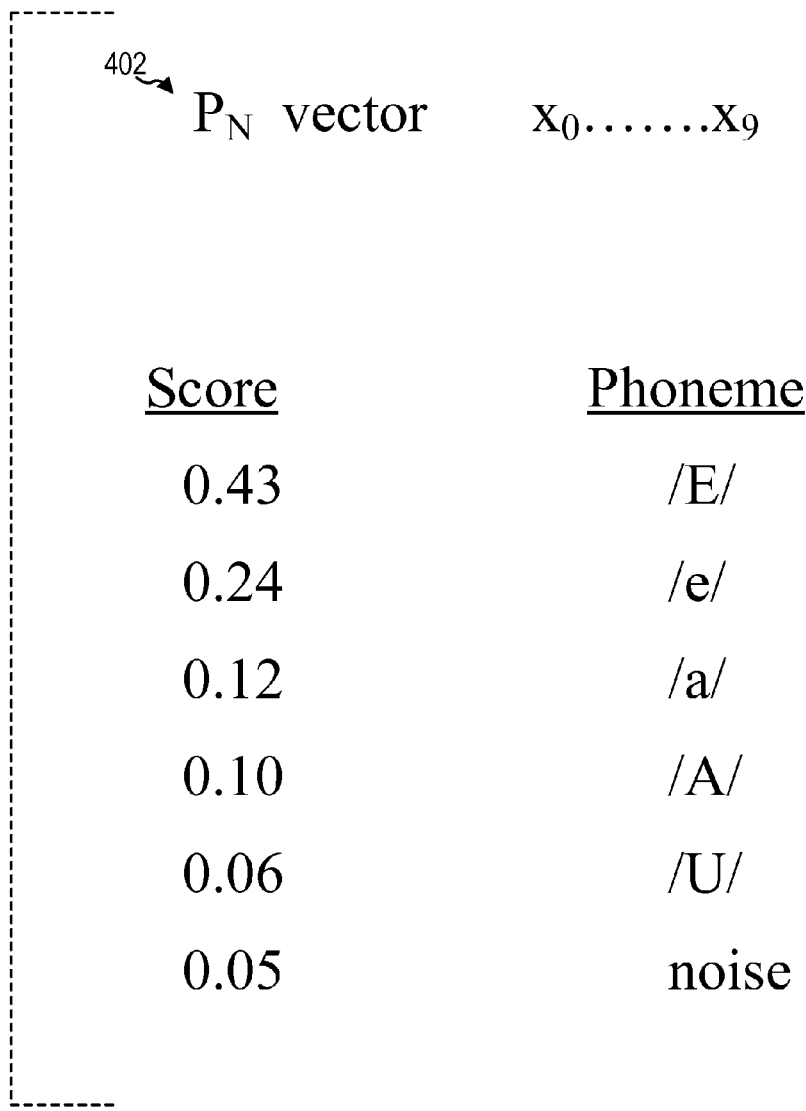
FIG. 4 illustrates phoneme processing according to one aspect of the present disclosure.

In one example, the speech recognition engine 218 may receive a series of feature vectors for sound corresponding to a user saying "Hello, how are you today?" The speech recognition engine 218 may attempt to match each feature vector with a phoneme in the speech recognition database 220. For example, FIG. 4 shows a series of feature vectors 402 corresponding to phoneme $P_N$ (representing the "e" sound in "hello"), including ten feature vectors $X_0$ through $X_9$. Upon processing of the first feature vector, the speech recognition engine 218 makes a preliminary determination as to the probability that the feature vector matches a phoneme, shown as the score in FIG. 4. Based on the feature vector, the phoneme /E/ may be assigned an initial score of 0.43 (representing a 43% probability that the matrix represents phoneme /E/), phoneme /e/ (a different pronunciation from /E/) may be assigned a score of 0.24, etc. The score may be based on how closely the feature vector matches a distribution associated with a phoneme state within one or more acoustic models stored in the speech storage 220. A feature vector may also be assigned a probability that the feature vector represents noise or silence. In the example of FIG. 4, the probability that the feature vector represents noise is 0.05. If the speech recognition engine 218 encounters feature vectors which it determines correspond with noise, those feature vectors may be discarded and removed from the speech recognition results.

Figure 5:
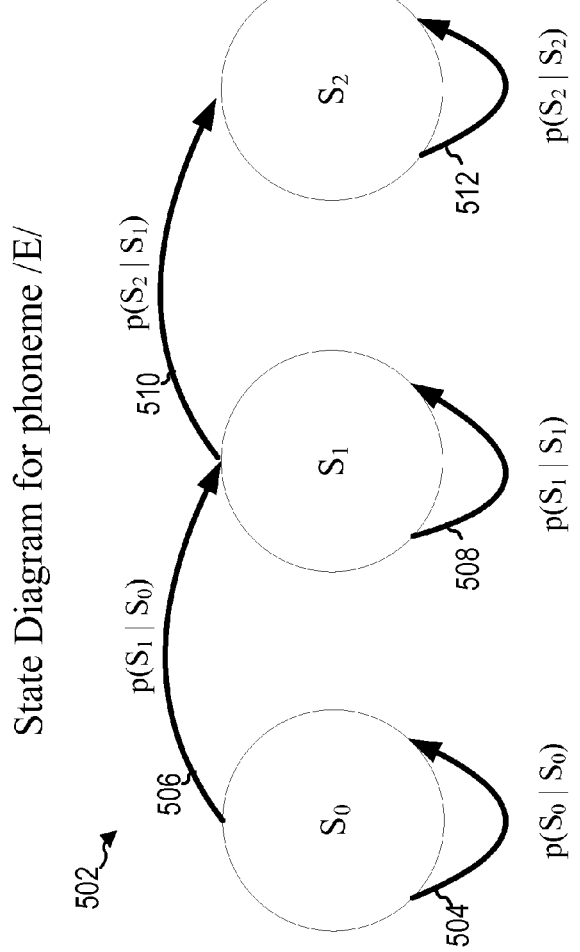
FIG. 5 illustrates phoneme processing in a Hidden Markov Model according to one aspect of the present disclosure.

Taking the example of the feature vector with a score of 0.43 for the phoneme /E/ shown in FIG. 4, the speech recognition engine 218 initially assigns a score of 0.43 that the feature vector matches the first state of the phoneme /E/, shown as state $S_0$ in the Hidden Markov Model illustrated in FIG. 5. After further processing, the speech recognition engine 218 determines whether the state should either remain the same, or change to a new state. For example, whether the state should remain the same 504 may depend on the corresponding transition probability (written as $P(S_0|S_0)$, meaning the probability of going from state $S_0$ to $S_0$) and how well the subsequent frame matches states $S_0$ and $S_1$. If state $S_1$ is the most probable, the calculations move to state $S_1$ and continue from there. For subsequent frames, the speech recognition engine 218 similarly determines whether the state should remain at $S_1$, using the transition probability represented by $P(S_1|S_1)$ 508, or move to the next state, using the transition probability $P(S_2|S_1)$ 510. As the processing continues, the speech recognition engine 218 continues calculating such probabilities including the probability 512 of remaining in state $S_2$ or the probability of moving from a state of illustrated phoneme /E/ to a state of another phoneme. After processing the feature vectors for state $S_2$, the speech recognition may move to the next phoneme in the utterance.

The probabilities and states may be calculated using a number of techniques. For example, probabilities for each state may be calculated using a Gaussian model, Gaussian mixture model, or other technique based on the feature vectors and the contents of the speech storage 220. Techniques such as maximum likelihood estimation (MLE) may be used to estimate the probability of phoneme states.

In addition to calculating potential states for one phoneme as a potential match to a feature vector, the speech recognition engine 218 may also calculate potential states for other phonemes, such as phoneme /e/ and/or phoneme /a/ for the example shown in FIG. 4 as potential matches for the feature vector. In this manner multiple states and state transition probabilities may be calculated.

The probable states and probable state transitions calculated by the speech recognition engine 218 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The speech recognition engine 218 may also compute scores of branches of the paths based on language models or grammars. Language modeling involves determining scores for what words are likely to be used together to form coherent words and sentences. Application of a language model may improve the likelihood that the ASR module 214 correctly interprets the speech contained in the audio data. For example, acoustic model processing returning the potential phoneme paths of "H E L O", "H A L O" and "Y E L O" may be adjusted by a language model to adjust the recognition scores of "H E L O" (interpreted as the word "hello"), "H A L O" (interpreted as the word "halo") and "Y E L O" (interpreted as the word "yellow") based on the language context of each word within the spoken utterance. The language modeling may be determined from a training corpus stored in the speech storage 220 and may be customized for particular applications.

Figure 6:
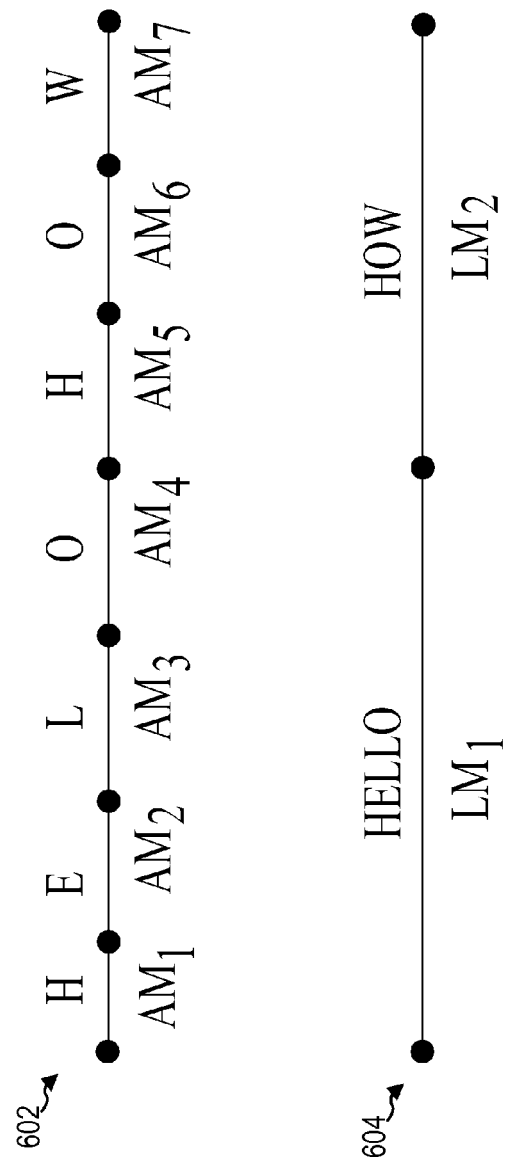
FIG. 6 illustrates phoneme processing and word processing according to one aspect of the present disclosure.

FIG. 6 illustrates the relationship between acoustic modeling and language modeling. As illustrated, each processed phoneme included in the path 602 is associated with an acoustic model score $AM_1$ through $AM_7$. The language model is then applied to associate each word in the path 604 with a language model score $LM_1$ or $LM_2$.

As part of the language modeling (or in other phases of the ASR processing) the speech recognition engine 218 may, to save computational resources, prune and discard low recognition score states or paths that have little likelihood of corresponding to the spoken utterance, either due to low recognition score pursuant to the language model, or for other reasons. Further, during the ASR processing the speech recognition engine 218 may iteratively perform additional processing passes on previously processed utterance portions. Later passes may incorporate results of earlier passes to refine and improve results.

Figure 7:
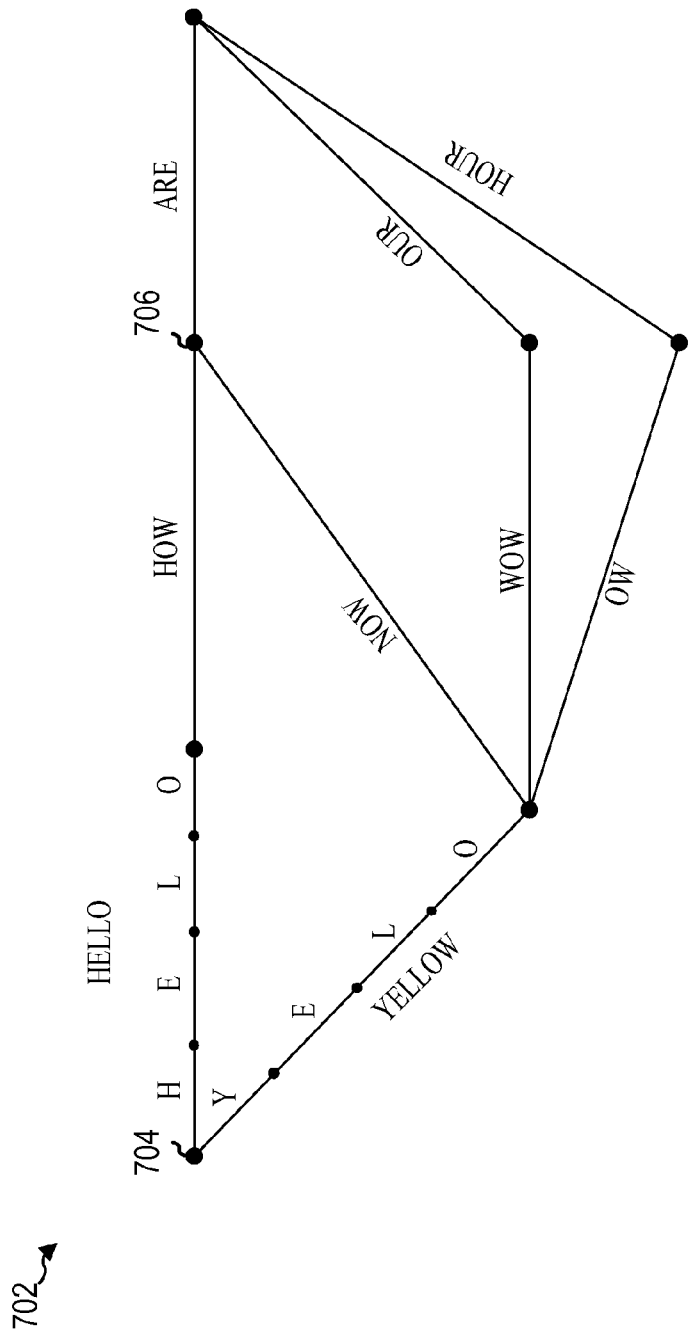
FIG. 7 illustrates a speech recognition lattice according to one aspect of the present disclosure.

The speech recognition engine 218 may combine potential paths into a lattice representing speech recognition results. A sample lattice is shown in FIG. 7. The lattice 702 shows multiple potential paths of speech recognition results. Paths between large nodes represent potential words (for example "hello", "yellow", etc.) and paths between smaller nodes represent potential phonemes (for example "H", "E", "L", "O" and "Y", "E", "L", "O"). For purposes of illustration, individual phonemes are only shown for the first two words of the lattice. The two paths between node 704 and node 706 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score and/or other factors, may be returned by the speech recognition engine 218 as the ASR result for the associated feature vectors.

The ASR module 214 may employ a decoding graph to assist with ASR processing. A decoding graph is a graph that may include all possible words that may be recognized by an ASR engine. The decoding graph may be comprised of many graphs representing possible recognized phonemes, upon which may be layered other graphs representing possible recognized words. A decoding graph may be implemented as a finite-state transducer (FST) that include all possible words that may be recognized by a speech recognition engine. While the lattice of FIG. 7 may be created dynamically to recognize words, an FST may be static in that it may be created in advance and the same FST may be used for the recognition of all utterances. An FST is a directed graph which includes paths for all sequences of words that may be recognized. The FST has an input (typically a spoken utterance) and an output (such as the words determined by the speech recognition engine that matches the spoken utterance, which corresponds to the path traversed through the FST during ASR processing). Each input and output of an FST may be associated with a weight, probability, or score.

An FST to be used for speech recognition may be created by combining smaller FSTs through a process called composition. Where two FSTs are to be applied in sequence to an input, the process of composition combines these two FSTs into a single FST and thus the input can be processed by a single FST. For example, where a first FST receives "x" and outputs "y" and a second FST receives "y" and outputs "z," the FST created by composing the first FST and the second FST may receive "x" and output "z." Multiple FSTs may be composed in this manner.

In some aspects, an FST used for speech recognition may be created by composing four FSTs that are each labeled as H, C, L, and G. The H FST may receive feature vectors (or other data output from an AFE) and output identifiers of HMM states (or some other sub-phonetic symbol). The C FST may receive HMM states as input and output identifiers of phonemes in context (or other subword unit). The L FST may receive phonemes in context and output words. The G FST may receive words and output a modified sequence of words and/or modify the weights or probabilities associated with words (based on a language model or grammar). The FST created by composing these four FSTs will receive feature vectors as input and output words. The above example is illustrative and other combinations of FSTs may be used for speech recognition. The composition of FSTs may be static in that they may be composed ahead of time and stored for use in speech recognition. The composition of FSTs may also be dynamic in that they may composed as part of the speech recognition process. In creating an FST for use with speech recognition, some FSTs may be composed statically and others may be composed dynamically.

In composing two or more FSTs together, the resulting FST may be much larger than the initial FSTs. When composing several FSTs together, the resulting FST may be very large. The size of an FST may be reduced through the processes of determinization and minimization. An FST may be determinized if, for each node in the FST, each arc exiting the node has a different label. An FST may be minimized if it has the minimum number of possible nodes. For example, depending on the application, a given word may appear only once in an FST, and an FST may be cyclical so that a given arc of the FST may be traversed more than once for a single utterance. For other applications, words may appear in an FST more than once so that the context of the word may be distinguished.

Figure 8:
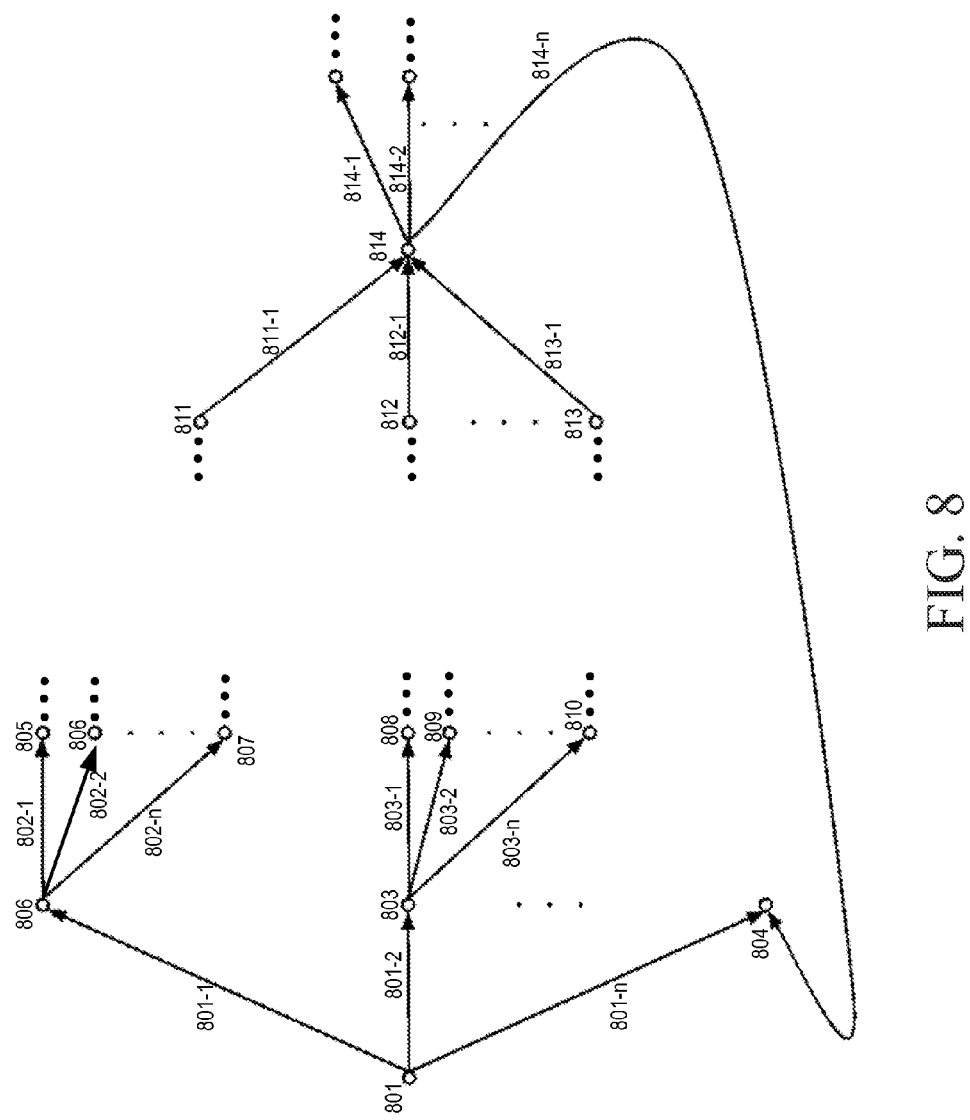
FIG. 8 illustrates portions of a finite state transducer according to one aspect of the present disclosure.

FIG. 8 shows an example of a small piece of an FST that may be used by a speech recognition engine. In FIG. 8, the FST may start at initial node 801. From initial node 801, there may be paths through the FST that correspond to sequences that may be recognized. The arcs in the FST may represent a distinct unit of processing. For example, an arc may correspond to an HMM for a particular triphone or may each correspond to a state of an HMM. Because the arcs may correspond to a unit that is smaller than a word, several arcs may need to be traversed before recognizing a word.

From initial node 801, there are n arcs labeled 801-1, 801-2, . . . , 801-n. These arcs may correspond to, for example, HMM states that may start an utterance or to HMMs that may start an utterance. Because the number of HMMs or HMM states that may start an utterance may be much smaller than the number of words in the lexicon, the number of initial arcs in an FST may be much smaller than the number of initial arcs in a lattice. The arcs leaving initial node 801 may be determinized. In some applications, each of the n arcs labeled 801-1, 801-2, . . . , 801-n may represent a different unit of processing, such as a different HMM or a different HMM state.

Each node of the FST may have multiple paths leading to the node and multiple paths from the node. For example, consider node 814, which has incoming arcs and outgoing arcs. Node 814 may allow transitions between different models represented by the arcs. Where the arcs represent triphone HMMs, arc 811-1 may represent the HMM for triphone X-A-B, arc 812-1 may represent the HMM for triphone Y-A-B, and arc 813-1 may represent the HMM for triphone Z-A-B. At node 814, each of the outgoing arcs may be able to follow each of the incoming arcs. By having the incoming arcs meet at a single node instead of ending at separate nodes, the FST may be more efficient and be able to avoid duplicative computations. At node 814, the outgoing arcs may represent HMMs for triphones that may follow the incoming arcs. Arc 814-1 may represent the HMM for triphone A-B-C, arc 814-2 may represent the triphone for A-B-D, and arc 814-n may represent the HMM for triphone A-B-E. The arcs of an FST may be weighted, meaning that the various arcs from a node may have scores relative to the other arcs from the node, such that the arc with a highest weight may be more likely to be chosen over an arc with a lower weight. A weighted FSTs may be referred to as a WFST.

The FST of FIG. 8 may be cyclical. Because a single word, such as "the" may appear in an utterance more than once, the FST may be more efficient if portions of it may be reused. For example, node 814 in FIG. 8 has an arc that goes back to node 804. Node 804 may be the start of a word that appears more than once in an utterance and thus node 804 may be traversed more than once during the transcription of a single utterance.

Figure 9A:
FIGS. 9A and 9B illustrate rule/tag parsing of utterance text according to one aspect of the present disclosure.

During speech recognition processing, it may be desirable to encode speech recognition results with further characteristics to assist in eventual processing of the speech recognition results. For example, if an ASR module is incorporated into an audio controlled banking system (such as a computer operated bank telephone number), an ASR module may desire to decode the input utterance when a user says "Please transfer two hundred dollars from my savings account to my checking account." Standard ASR decoding involves processing the input audio into feature vectors and ASR results as described above. To add additional functionality, however, the ASR module may also wish to characterize portions of the utterance for faster processing. Such characterization may include identifying the word "transfer" as a type of transaction. The characterization may also include identifying the words "two hundred dollars" as an amount, "savings account" as a source, and/or "checking account" as a destination. Such a characterization is illustrated in FIG. 9A.

This characterization may be performed by applying identifiers, such as rules, tags, or other forms of metadata to certain portions of an utterance. Examples of identifiers include semantic identifiers, syntactic identifiers, etc. A semantic identifier is a code which indicates how certain data, such as ASR text, is to be treated, identified, or characterized, for example for use by later applications. Rules and tags are examples of semantic identifiers. A rule is a classification of data included between the beginning and end of the rule. A rule may indicate a type for the data included between the rule end and rule beginning A rule may also be an instruction based on the utterance which may be performed by an application using the ASR data. A rule may instruct an application to treat a certain portion of an utterance in a particular way. For example, a rule may indicate the beginning and end of a banking transaction, travel reservation, greeting, etc. A tag is a semantic point indicating some characteristic of an utterance portion. The tag may include a code or other indicator used to mark the point in some manner. The code/indicator may then be used by a later process for some sort of operation or application. For example, a tag may be a unique identifier code corresponding to a specific person, a code representing an answer to a specific question (such as "affirmative response" or "negative response"), a general description of a data type corresponding to a word (such as "city", "state", etc.), or other qualifier. A tag may be placed on an utterance portion as part of the execution of a rule. Rules may also be nested, with certain rules containing other sub-rules. The types of rules and/or tags may be customized for specific applications which may ultimately use the ASR results.

A processor, either as part of the ASR process or following the ASR process, may insert rules and tags into text for processing by a later application. For example, a greeting utterance "Hello my name is John Smith" may be processed with the following rules and tags:

RULE GREETING [
Hello my name is
RULE NAME [
John Smith {TAG: ID4711}
]
]

Figure 9B:
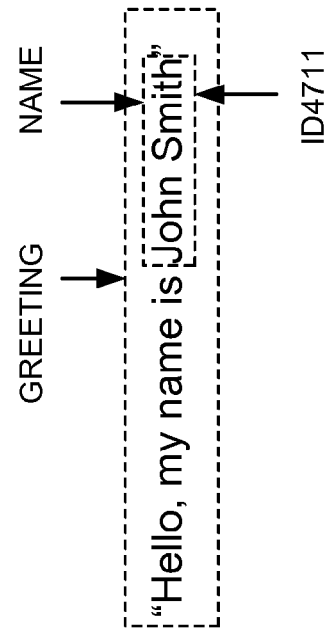

The above application of rules and tags is illustrated in FIG. 9B.

In the example shown above and in FIG. 9B, the first rule "GREETING" begins at the first open bracket, ends at the second closed bracket, and includes the entire utterance "Hello my name is John Smith." The second rule "NAME" begins at the second open bracket, ends at the first closed bracket, and includes the utterance portion "John Smith." A tag "ID4711" is also inserted and associated with the utterance portion "John Smith." A later application program which processes greetings as part of the application (for example, a social media speech application) may process the entire utterance as a greeting (for example, to initiate a conversation), may process the utterance portion "John Smith" as a name (for example, to identify the conversation participant) and may tag "John Smith" with code "ID4711" which may be used to identify the specific conversation participant (for example, to group all of John Smith's conversations or to associate the conversation with other information about John Smith).

As illustrated, there may be some overlap between the rules and tags depending on how certain rules and tags are applied to an utterance for a particular application. By characterizing portions of an utterance using rules and tags in this manner, the functional processing of the ASR results by the eventual application (such as a social media application, banking program, etc.) may be improved.

To create rules and tags associated with an ASR utterance an ASR module may include a grammar so that an ASR processor may encode rules, sub-rules (rules within rules) and tags into a processed utterance. The grammar may be customized based on potential applications. For example, a grammar for use with ASR processing for a banking transaction may be configured to recognize trigger words such as "transfer", "from", "to", etc. to apply the rules and tags. Problems may arise, however, when implementing an FST in ASR processing as an FST is a "flat" structure, meaning that a path through the FST may produce a single output string and any hierarchical designations from a grammar, such as rules, tags, etc. may be lost when processing using an FST. Maintenance of the rules hierarchy may be desirable for a number of reasons, including post ASR processing. In certain aspects an FST may also be constructed to output a N-best list or lattice, but loss of hierarchical designations may remain.

To address this problem, extra symbols may be added to an FST to indicate when a portion of a parsed utterance entered and exited a rule. Extra symbols may also be added to indicate insertion of a tag. These extra symbols may be associated with one or more arcs in an FST such that when an utterance is parsed and passes over the arc, the rule/tag symbol associated with the arc may be added to the FST output string. The enhanced FST may be based on the grammar which includes the rules and tags. The FST may be constructed such that certain words are repeated in various arcs of the FST though the words may be associated with different rules and/or tags in each of those various arcs. Further, other types of encoding beyond rules and tags may be inserted into FST arcs as desired. The encoding types may be configured for the ultimate application that may make use of the processed ASR results.

Figure 10:
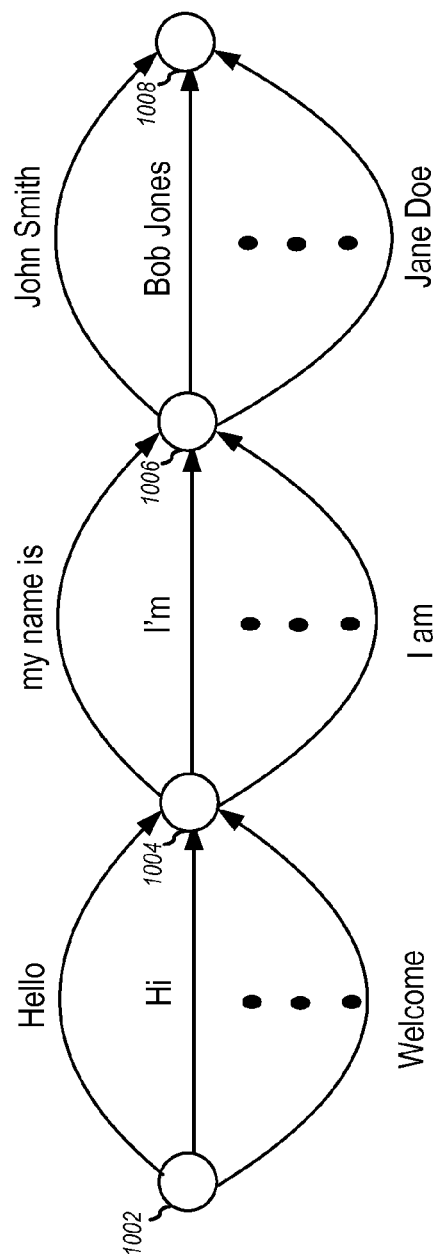
FIG. 10 illustrates a portion of a finite state transducer according to one aspect of the present disclosure.

In one example, the difference between a traditional FST and an enhanced FST with encoding inserted into the arcs is illustrated as follows. An example of a simplified traditional FST configured to process a greeting is shown in FIG. 10. As illustrated, the sample FST of FIG. 10 is configured to process certain potential greeting utterances including several specific names. For purposes of illustration, only certain greeting utterances and names are shown. A much larger FST may be constructed for additional greetings and names. Also for purposes of illustration, greeting components (such as a first and last name) are grouped together whereas a typical FST may be configured to process single words at a time. Finally, only outputs are illustrated in the FST of FIG. 10.

As illustrated in FIG. 10, a greeting may be processed by traversing a path through the FST from node 1002 to 1008. Different paths are possible and are traversed depending on the processed utterance. A path through a traditional FST for ASR processing, such as that shown in FIG. 10, may yield an output string of plain text of:

Hello my name is John Smith

As illustrated in FIG. 9B, it may be desirable to characterize a greeting through application of rules and tags. For example, a set of rules and tags may be specified such that the code "RULE:GREETING" indicates the beginning of a rule entitled "GREETING", "RULE:NAME" indicates the beginning of a rule entitled "NAME", "TAG:XX1234" indicates insertion of a tag of "XX1234" (where the value of the tag may change as desired), and a code "RULEEND" indicates the end of a rule. Placement of the encoding indicating the beginning and end of rules and tags is determined through application of the grammar configured for parsing of a subject utterance, as explained further below.

A sample of an FST portion configured to encode these rule/tag markers into an output string is shown in FIG. 1. As noted, for purposes of illustration the FST of FIG. 1 shows only outputs. As shown in FIG. 1, an FST may be annotated to include rule encoding into ASR results. As noted above, each segment of the greeting is illustrated to be its own arc in the FST of FIG. 1 even though an FST in practice may be divided such that each word (or other speech unit) has its own arc. The sample FST begins with the rule beginning code RULE: GREETING encoded in the arc from node 102 to node 104. This rule beginning code will be inserted at the beginning of the output string for the FST shown in FIG. 1. The text for processed greeting initiators (e.g., "Hello") are shown in the arcs from node 104 to node 106. The FST will choose an arc to traverse based on the speech included in the processed audio data. Similarly, the FST will choose an arc to traverse between nodes 106 and 108 based on the speech in the audio data. The arc from node 108 to node 110 is encoded with the rule beginning code RULE:NAME. This code will be inserted at the corresponding location in the FST output string. Next, based again on the utterance, the FST will traverse an arc from node 110 to node 112a, 112b, through 112n, where n represents the number of names included in the FST. Depending on the path chosen by the FST, a particular tag will also be encoded into the output string. As shown in the arcs from nodes 112a, 112b, or 112n to node 114, each of the next arcs includes a tag code, corresponding with a tag number associated with the specific name of the previous arc traversed. Once reaching node 114, the FST path will continue to node 116, adding a RULEEND code to the output string. This code will end the most recent activated rule, specifically the NAME rule. The arc from node 116 to node 118 will add another RULEEND code to the output string, ending the next most recent rule, specifically the GREETING rule. Note that while a rule may have a beginning and an end with multiple arcs in between, a tag is generally a stand-alone entry in an FST that typically relates to the ASR unit directly before or after the tag.

If the enhanced FST of FIG. 1 is used during processing of the utterance including the greeting example from FIG. 9B, the FST will traverse the appropriate path and yield an output string of:

RULE:GREETING Hello my name is RULE:NAME John Smith TAG:ID4711 RULEEND RULEEND

Encoding rule and tag parsing into an FST may allow for encoded output strings like those shown, which in turn may improve ASR-application integration and processing. With the encoding, later applications which receive the ASR output may process the speech and encoding as desired. Depending on the encoding, later applications may convert the encoding (for example, "RULE:GREETING") to the appropriate language/instructions for processing by the application.

In one aspect, the encoding built into the grammar/FST may be specifically formatted for easier manipulation and processing by the later application. For instance, the encoding of the FST may be written in a format recognized by an application. The FST output may also be a notation configured so that it is executable by a later application. The FST output may be written in formats such as Extensible Markup Language (XML), JavaScript, JavaScript Object Notation (JSON), YAML Ain't Markup Language (YAML), and the like. Thus, the FST may include sections of executable JavaScript code which may be output as part of the FST output string for execution by a later application. In this aspect, the format of the special encoding symbols, as well as the format of the words, may be configured so that the output string forms a well-formed recognition result with embedded code for execution by the later application in question. Such later applications may include a music playing application, a reminder application, a calendar application, a communication application (such as telephone application), or other application.

For example, to format an output string encoded for JSON, a rule may be encoded as:

{"Type":"Rule","Rulename": "name", "Contents": [ and a rule end may be encoded as:

]}

A tag may be encoded as:

{"Type":"Tag","Value":"XX1234"} where XX1234 is the desired tag.

Figure 11:
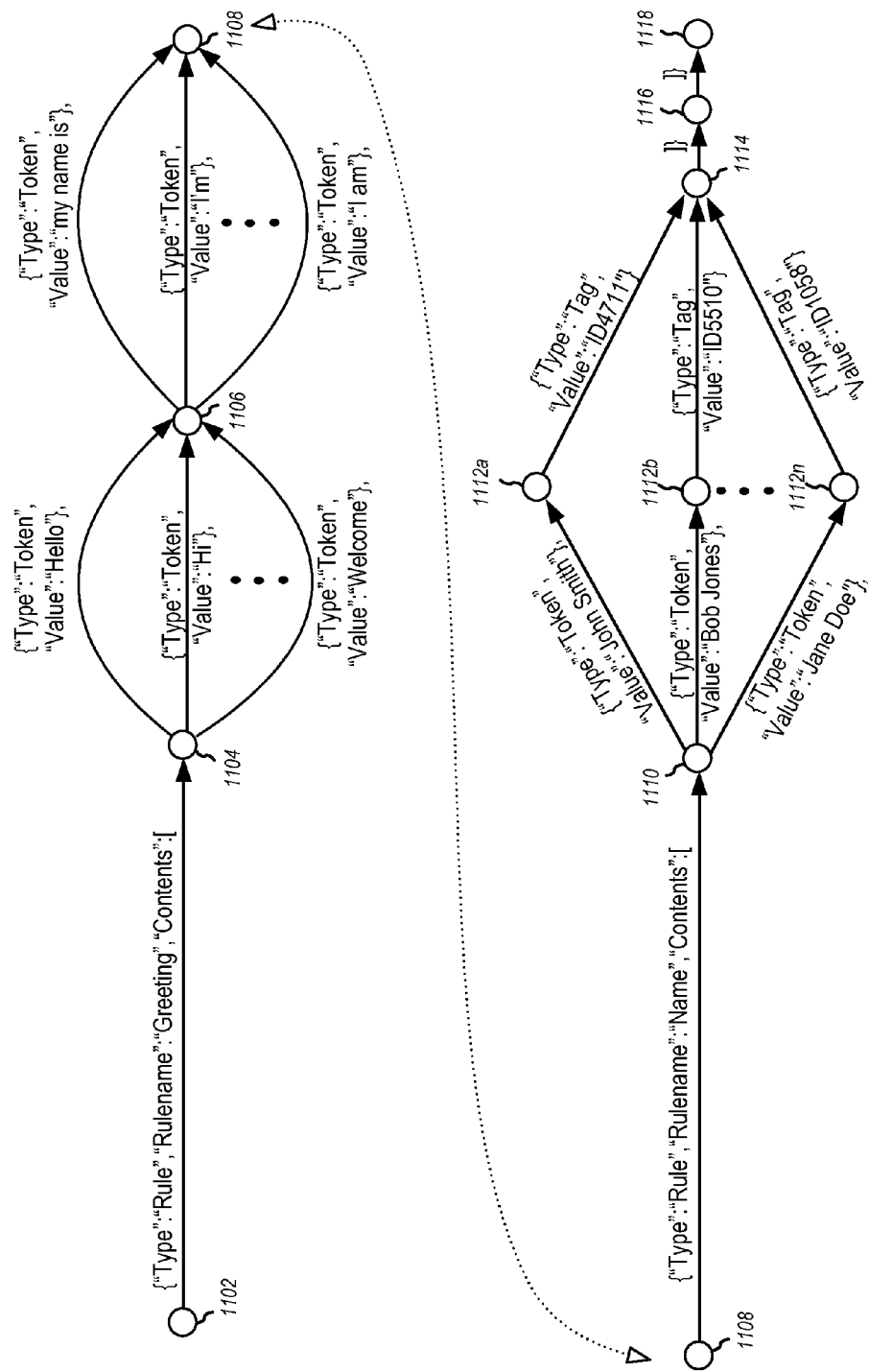
FIG. 11 illustrates portions of an enhanced finite state transducer encoded in a JavaScript Object Notation format according to one aspect of the present disclosure.
Figure 12:
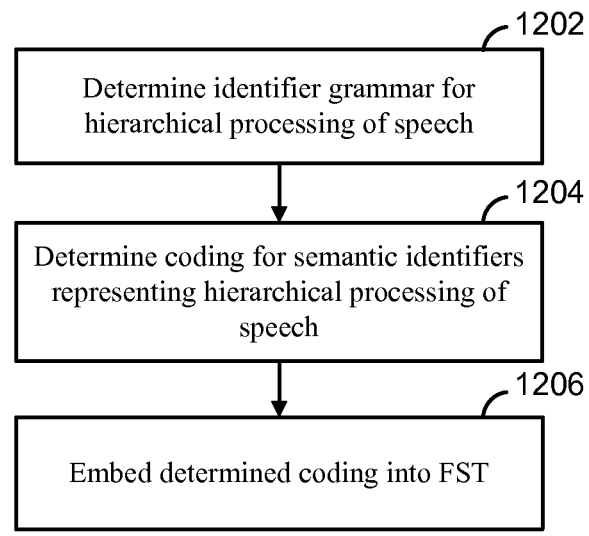
FIG. 12 illustrates configuring an enhanced finite state transducer according to one aspect of the present disclosure.

To create a JSON formatted output string, an FST may be constructed for processing speech with JSON formatted codes for rules and tags. An example of such an FST is shown in FIG. 11. FIG. 11 shows a sample FST for processing a greeting. For ease of illustration, the FST of FIG. 11 has been broken into two halves. Node 1108 is shown twice, such that the top half of FIG. 11 continues along to the bottom half of FIG. 11. As can be seen, the encoding of the FST of FIG. 11 is analogous to the encoding of the FST of FIG. 1, only the encoding for FIG. 11 is specifically formatted in JSON. As such, traversing the FST of FIG. 11 will provide an output string similar to that of the FST of FIG. 1, only formatted in JSON. For example, if the utterance of FIG. 9B is processed by the encoded FST of FIG. 11, the output string would be:

{"Type": "Rule", "Rulename": "Greeting", "Contents": [
{"Type": "Token", "Value": "Hello"},
{"Type": "Token", "Value": "my name is"},
{"Type": "Rule", "Rulename": "Name", "Contents": [
{"Type: "Token", "Value": "John Smith"},
{"Type": "Tag", "Value": "ID4711"}
]}
]}

As illustrated in FIG. 11 (and FIG. 1), several arcs of the illustrated FST portions serve only to include characters which mark the end of rules/tags, as certain rules may extend over more than one arc, for example, the arc from node 1102 to 1104 (or 102 to 104), etc. Thus, a single pass through the enhanced FST may result in a string including executable code to be output from the speech recognition engine.

The coding in the FST may be determined based on the application to which the processed output string will be sent. For example, if the ultimate application recognizes code in XML format, the FST may be configured to include XML codes. If the ultimate application recognizes special application specific codes (such as codes to initiate a telephone call or launch a specific software program) those codes may also be included in the FST.

To construct an FST which includes the encoding in the arcs, a grammar may be defined including the rules/tags to be applied in the FST. Grammars and FSTs may be configured for a variety of general or specific applications. To construct the FST illustrated in FIG. 11, a grammar may be defined including the rules and tags to be applied in the FST. An example of a grammar for the FST illustrated in FIG. 11 is shown below:

```
<?xml version="1.0" encoding="ISO-8859-1"?>
<!DOCTYPE grammar PUBLIC "-//W3C//DTD GRAMMAR 1.0//EN"
    "http://www.w3.org/TR/speech-grammar/grammar.dtd">
<grammar xmlns="http://www.w3.org/2001/06/grammar"
    xmlns:xsi="http://www.w3.org/2001/XMLSchema-instance"
    xsi:schemaLocation="http://www.w3.org/2001/06/grammar
        http://www.w3.org/TR/speech-grammar/grammar.xsd"
    xml:lang="en" version="1.0" root="sample" mode="voice">
  <rule id="Greeting" scope="public">
    <one-of>
      <item>Hello</item>
      <item>Hi</item>
      <item>Welcome</item>
    </one-of>
    <one-of>
      <item>my name is</item>
      <item>I'm</item>
      <item>I am</item>
    </one-of>
    <ruleref uri="#Name"/>
  </rule>
  <rule id="Name" scope="public">
    <one-of>
```

```
    <item>John Smith<tag>ID4711</tag></item>
    <item>Bob Jones<tag>ID5510</tag></item>
    <item>Jane Doe<tag>ID1058</tag></item>
  </one-of>
 </rule>
</grammar>
```

The above grammar is a speech recognition grammar specification formatted in XML (Extensible Markup Language). Referenced in the grammar are several industry standard definitions including ISO-8859-1, a standard for 8-bit character encoding and several resources from the Word Wide Web Consortium (W3C) regarding speech recognition. As described above, a complete FST grammar may be constructed through the composition of smaller FSTs and grammars. A variety of grammar techniques may be used, including W3C grammars (such as those illustrated above), a Backus-Naur Form (BNF) grammar, or other techniques.

To create an enhanced FST each rule will begin with a single FST (and corresponding small grammar) to represent the start and end nodes of a rule and the intervening arc. Then an FST for each path choice in the rule (and corresponding small grammar) may be created and a union operation is performed to merge the FSTs together for the full rule. For example, each name choice may have its own FST/grammar which will then be combined together to create a single FST/grammar representing all the name choices and associated identifying tags. The FST/grammar with the name choices and tags may then be concatenated with the FST/grammar with the rule start and end codes and the complete rule FST/grammar will be constructed. In another aspect, an enhanced FST may be created by concatenating an FST for the semantic identifiers with a pre-formed FST for the speech results.

For purposes of this application, rules, tags, and the like may together be called "semantic identifiers," although they may indicate syntactic or other functions. The grammar which defines the rules, tags, etc. may be referred to as the identifier grammar. Based on the identifier grammar, the FST may be embedded with codes corresponding to the indicators and representing the processing corresponding to the encoded text.

In one aspect of the present disclosure, parse information such as semantic identifiers may be included in the output of an FST during ASR processing. An ASR device may determine an identifier grammar for processing of speech, as shown in block 1202. The grammar may be constructed to reflect the rules and tags that are desired to be applied to the text of the processed utterance. For instance, in the example above a grammar is constructed creating a rule for the greeting as well as a rule for individual names, with tags associated for the sample possible names in the example. A grammar compiler, such as one pursuant to the grXML (an XML speech recognition grammar specification) or SRGS (a W3C speech recognition grammar specification) may be used to create the grammar. Based on the identifier grammar, the ASR device may then determine coding for semantic identifiers representing hierarchical processing of speech, as shown in block 1204.

The determined coding may then be embedded into an FST, as shown in block 1206. The coding may be embedded into arcs of the FST corresponding to the words of the speech to be processed according to the semantic identifiers.

In some embodiments, an FST may be constructed by combining multiple smaller FSTs through operations such as the union or concatenation of other FSTs. A union of two FSTs indicates that the paths of either FST are allowed. A concatenation of a first FST with a second FST requires that path of the first FST be followed by a path of a second FST. For example, the FST of FIG. 11 could be created through the following sequence of operations.

Multiple FSTs may be created and combined to create the FST including the semantic identifiers. The FST may be created from the bottom up, with specific FSTs for the embedded rules and tags combined to form the FST for the overall grammar. Using the above example grammar, for instance, an FST may be created for each of the potential names and tags associated with the names. For example, one small FST may include two nodes with one arc between them, the output of the FST would be the name "John Smith." (As indicated above, implementation of this example may also include a single FST for each word, such as one for "John" and one for "Smith." For purposes of present illustration, however, they are treated together.) Another small FST may include two nodes with one arc between them, the output of the FST would be the tag "ID4711". The FSTs for the name and the tag may be combined to create a single FST with one path over two arcs where the output would be John Smith TAG:ID4711. This process may be repeated for each of the available name choices, creating three separate name/tag FSTs. Those name/tag FSTs may be combined in a union operation, where the individual name FSTs may be combined to a larger FST representing the potential name choices. The name choice FST includes the symbols indicating the start and end of the name rule as well as the symbols indicating the tags corresponding to the specific names. The name choice FST may be concatenated with other FSTs to create the FST for the grammar, which also includes the symbols indicating the start and end of the greeting rule. The encoded FST for the identifier grammar may then be used for speech recognition.

Figure 13:
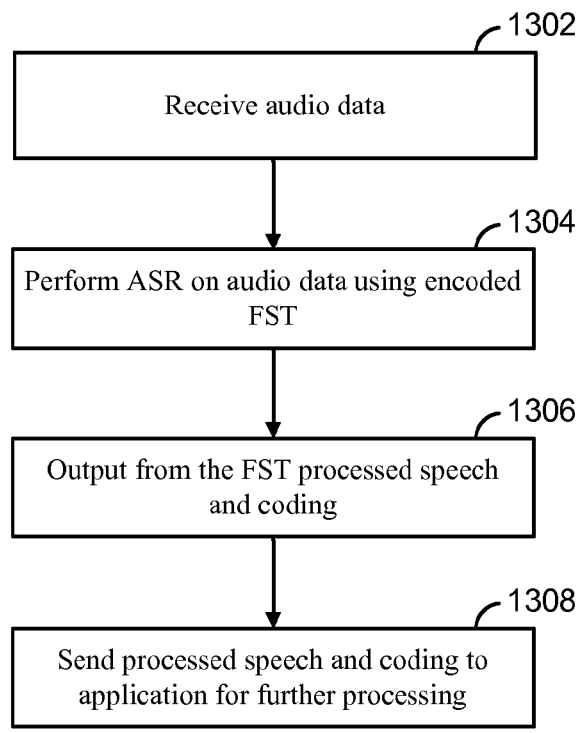
FIG. 13 illustrates performing speech recognition according to one aspect of the present disclosure.

Speech recognition with the enhanced FST is illustrated in FIG. 13. The ASR device may receive audio data, as shown in block 1302, and perform speech recognition on the audio data using the enhanced FST, as shown in block 1304. The speech recognition processing may use only the enhanced FST, the speech recognition processing may perform dynamic composition of the enhanced FST with one or more other FSTs, or the speech recognition processing may perform other operations on the enhanced FST. Based on the input audio data, the speech recognition will traverse a path through the FST and then output from the FST an output string including the processed speech and the portions of the coding corresponding to the processed speech, as shown in block 1306. The ASR device may then pass the output string to another application for post-ASR processing based on the coding and processed speech, as shown in block 1308.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the ASR techniques described herein may be applied to many different languages, based on the language information stored in the speech storage.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk and/or other media.

Aspects of the present disclosure may be performed in different forms of software, firmware and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A method of performing speech recognition, the method comprising:
   creating a first finite state transducer (FST) using a speech recognition grammar, wherein a first arc of the first FST comprises a first semantic identifier and a second arc of the FST comprises a second semantic identifier;
   obtaining a second FST, wherein the second FST is for transducing speech recognition feature vectors to words;
   creating a third FST by composing the first FST and the second FST;
   receiving audio data comprising speech;
   performing speech recognition on the received audio data using the third FST to produce speech recognition results, wherein the speech recognition results comprise the first semantic identifier and the second semantic identifier; and
   processing the speech recognition results with an application, wherein the application processes the first semantic identifier and the second semantic identifier.

2. The method of claim 1, wherein the application comprises one of a music playing application, a reminder application, a calendar application, or a communication application.

3. The method of claim 1, wherein the first semantic identifier comprises one of a rule beginning, a rule end, or a tag.

4. The method of claim 1, wherein the first semantic identifier comprises notation in Extensible Markup Language or JavaScript Object Notation.

5. The method of claim 1, wherein creating the first FST using the speech recognition grammar comprises:
   creating a first sub-FST from a first rule and creating a second sub-FST from a second rule; and
   creating the first FST using the first sub-FST and the second sub-FST.

6. A method, comprising:
   receiving audio data comprising speech;
   obtaining a speech recognition finite state transducer (FST), wherein a first arc of the speech recognition FST comprises text and a first semantic identifier and a second arc of the speech recognition FST comprises a second semantic identifier;
   performing speech recognition on the received audio data using the speech recognition FST to produce speech recognition results output from the speech recognition FST; and
   wherein the speech recognition results comprise an output string, the output string including the text, the first semantic identifier and the second semantic identifier.

7. The method of claim 6, wherein the first semantic identifier corresponds to hierarchical designation information corresponding to the speech.

8. The method of claim 6, further comprising processing the speech recognition results by an application, wherein the application processes the first semantic identifier and the second semantic identifier.

9. The method of claim 6, wherein the first semantic identifier comprises notation in Extensible Markup Language or JavaScript Object Notation.

10. The method of claim 6, wherein the first semantic identifier comprises one of a rule beginning, a rule ending, or a tag.

11. The method of claim 6, wherein the speech recognition results comprise a top-N list of output string hypotheses.

12. The method of claim 6, wherein the FST was created by composing a first FST for transducing feature vectors to hidden Markov model states, a second FST for transducing the hidden Markov model states to speech units in context, a third FST for transducing the speech units in context to words, and a fourth FST representing a grammar.

13. The method of claim 6, wherein performing speech recognition comprises dynamically composing the FST with a second FST.

14. A computing device, comprising:
    at least one processor;
    a memory device including instructions operable to be executed by the at least one processor to perform a set of actions, configuring the processor:
      to receive audio data comprising speech;
      to obtain a speech recognition finite state transducer (FST), wherein a first arc of the speech recognition FST comprises text and a first semantic identifier and a second arc of the speech recognition FST comprises a second semantic identifier;
      to perform speech recognition on the received audio data using the speech recognition FST to produce speech recognition results output from the speech recognition FST; and
      wherein the speech recognition results comprise an output string, the output string including the text, the first semantic identifier and the second semantic identifier.

15. The computing device of claim 14, wherein the first semantic identifier corresponds to hierarchical designation information corresponding to the speech.

16. The computing device of claim 14, wherein the processor is further configured to process the speech recognition results by an application, wherein the application processes the first semantic identifier and the second semantic identifier.

17. The computing device of claim 14, wherein the first semantic identifier comprises notation in Extensible Markup Language or JavaScript Object Notation.

18. The computing device of claim 14, wherein the first semantic identifier comprises one of a rule beginning, a rule ending, or a tag.

19. The computing device of claim 14, wherein the speech recognition results comprise a top-N list of hypotheses.

20. The computing device of claim 14, wherein the FST was created by composing a first FST for transducing feature vectors to hidden Markov model states, a second FST for transducing the hidden Markov model states to speech units in context, a third FST for transducing the speech units in context to words, and a fourth FST representing a grammar.

21. The computing device of claim 14, wherein the processor configured to process speech recognition comprises the processor configured to dynamically compose the FST with a second FST.

* * * * *